(12) United States Patent
Ellifson

(10) Patent No.: US 8,876,133 B2
(45) Date of Patent: Nov. 4, 2014

(54) VALVE FOR A VEHICLE SUSPENSION SYSTEM

(71) Applicant: Oshkosh Corporation, Oshkosh, WI (US)

(72) Inventor: Erik S. Ellifson, Oshkosh, WI (US)

(73) Assignee: Oshkosh Corporation, Oshkosh, WI (US)

( * ) Notice: Subject to any disclaimer, the term of this patent is extended or adjusted under 35 U.S.C. 154(b) by 0 days.

(21) Appl. No.: 13/792,153

(22) Filed: Mar. 10, 2013

(65) Prior Publication Data

US 2013/0249175 A1  Sep. 26, 2013

Related U.S. Application Data

(60) Provisional application No. 61/615,710, filed on Mar. 26, 2012.

(51) Int. Cl.
| | |
|---|---|
| *B60G 11/27* | (2006.01) |
| *F16F 9/34* | (2006.01) |
| *F16F 9/02* | (2006.01) |
| *F16K 1/00* | (2006.01) |
| *B60G 17/056* | (2006.01) |
| *B60G 17/052* | (2006.01) |
| *F16F 9/096* | (2006.01) |

(52) U.S. Cl.
CPC .............. *B60G 17/0525* (2013.01); *F16F 9/34* (2013.01); *F16F 9/0281* (2013.01); *F16K 1/00* (2013.01); *B60G 11/27* (2013.01); *B60G 17/056* (2013.01); *F16F 9/096* (2013.01)

USPC .................................................. 280/124.157

(58) Field of Classification Search
USPC ............ 280/5.514, 6.157, 124.157, 124.158, 280/124.159, 124.16
See application file for complete search history.

(56) References Cited

U.S. PATENT DOCUMENTS

| | | | |
|---|---|---|---|
| 2,895,744 A | 7/1959 | Jackson | |
| 2,948,549 A | 8/1960 | Schultz | |
| 3,603,613 A | 9/1971 | Erdmann | |
| 4,153,237 A | 5/1979 | Supalla | |
| 5,586,781 A | 12/1996 | Anderson | |
| 6,264,212 B1 * | 7/2001 | Timoney | 280/5.51 |
| 6,845,988 B2 * | 1/2005 | Romer et al. | 280/5.514 |
| 7,823,895 B2 | 11/2010 | Wagne | |
| 2003/0107191 A1 * | 6/2003 | Romer et al. | 280/5.514 |

* cited by examiner

*Primary Examiner* — Paul N Dickson
*Assistant Examiner* — Robert A Coker
(74) *Attorney, Agent, or Firm* — Foley & Lardner LLP

(57) ABSTRACT

A valve assembly for a suspension system includes a housing having a control port, a first accessory port, and a second accessory port. The housing defines a first flow path extending between the control port and the first accessory port and a second flow path extending between the control port and the second accessory port. The valve assembly also includes a first check valve having a first crack pressure positioned within the housing along the first flow path and a second check valve having a second crack pressure positioned within the housing along the second flow path. A difference between the first crack pressure and the second crack pressure provides a corresponding difference in pressures at the first accessory port and the second accessory port.

10 Claims, 13 Drawing Sheets

VALVE FOR A VEHICLE SUSPENSION SYSTEM

CROSS-REFERENCE TO RELATED PATENT APPLICATIONS

This application claims the benefit of U.S. Provisional Patent Application No. 61/615,710, filed Mar. 26, 2012, which is incorporated herein by reference in its entirety.

BACKGROUND

The present application relates to suspension systems for vehicles. More specifically, the present application relates to a valve for a suspension system. Suspension systems may include springs that have a gas stored therein. The weight of the sprung mass of the vehicle compresses the gas within the spring. The pressure of the gas within the spring is related to the weight of the vehicle, and the cross-sectional area of the spring chamber, the temperature of the operating environment, and still other considerations. The gas within the spring is charged to an initial pressure, which relates to an initial ride height. As payload is added to the vehicle, the gas within the spring is further compressed, and the ride height of the vehicle decreases. Similarly, the pressure of the gas within the spring changes with the temperature of the operating environment thereby altering the ride height of the vehicle.

Traditional gas springs modulate ride height with multiple pneumatic sources that apply pressurized fluid to the spring. Other systems utilize complex control systems to maintain an appropriate pressure of the gas within the spring. Such systems are expensive, require numerous additional components, and introduce a failure mode by relying on intermediate electronic controls to charge the spring to a particular pressure.

SUMMARY

One embodiment of the invention relates to a valve assembly for a suspension system. The valve assembly includes a housing having a control port, a first accessory port, and a second accessory port. The housing defines a first flow path extending between the control port and the first accessory port and a second flow path extending between the control port and the second accessory port. The valve assembly also includes a first check valve having a first crack pressure positioned within the housing along the first flow path and a second check valve having a second crack pressure positioned within the housing along the second flow path. A difference between the first crack pressure and the second crack pressure provides a corresponding difference in pressures at the first accessory port and the second accessory port.

Another embodiment of the invention relates to a suspension assembly for a vehicle that includes a gas spring and a valve assembly. The gas spring includes a tubular housing and a plunger positioned within the tubular housing. The plunger and an inner surface of the tubular housing define a spring volume. The gas spring also includes a reservoir having a housing that defines an inner volume and a flexible member coupled to the housing, the flexible member separating the inner volume into a working volume and a control volume. The gas spring also includes a conduit coupling the tubular housing to the reservoir such that the spring volume is in fluid communication with the working volume. The valve assembly includes a housing having a control port, a spring port in fluid communication with the spring volume, and an accumulator port in fluid communication with the control volume. The housing defines a first flow path extending between the control port and the spring port and a second flow path extending between the control port and the accumulator port. The valve assembly also includes a first check valve having a first crack pressure and positioned within the housing along the first flow path and a second check valve having a second crack pressure and positioned within the housing along the second flow path. The valve assembly provides an offset pressure between the spring volume and the control volume to maintain a response curve of the gas spring for different ride heights of the vehicle.

Yet another embodiment of the invention relates to a method for changing the ride height of a vehicle. The method includes providing a gas spring having a housing that defines a spring volume, an accumulator that defines a control volume, and a valve assembly having a regulation port and a plurality of check valves having different crack pressures. The method also includes applying a pressurized fluid to the regulation port with a flow source and maintaining a pressure differential between the spring volume and the control volume. The pressure differential corresponds to a difference in the crack pressures of the plurality of check valves.

The invention is capable of other embodiments and of being carried out in various ways. Alternative exemplary embodiments relate to other features and combinations of features as may be recited in the claims.

BRIEF DESCRIPTION OF THE FIGURES

The disclosure will become more fully understood from the following detailed description, taken in conjunction with the accompanying figures, wherein like reference numerals refer to like elements, in which.

DETAILED DESCRIPTION

Before turning to the figures, which illustrate the exemplary embodiments in detail, it should be understood that the present application is not limited to the details or methodology set forth in the description or illustrated in the figures. It should also be understood that the terminology is for the purpose of description only and should not be regarded as limiting.

Figure 1:
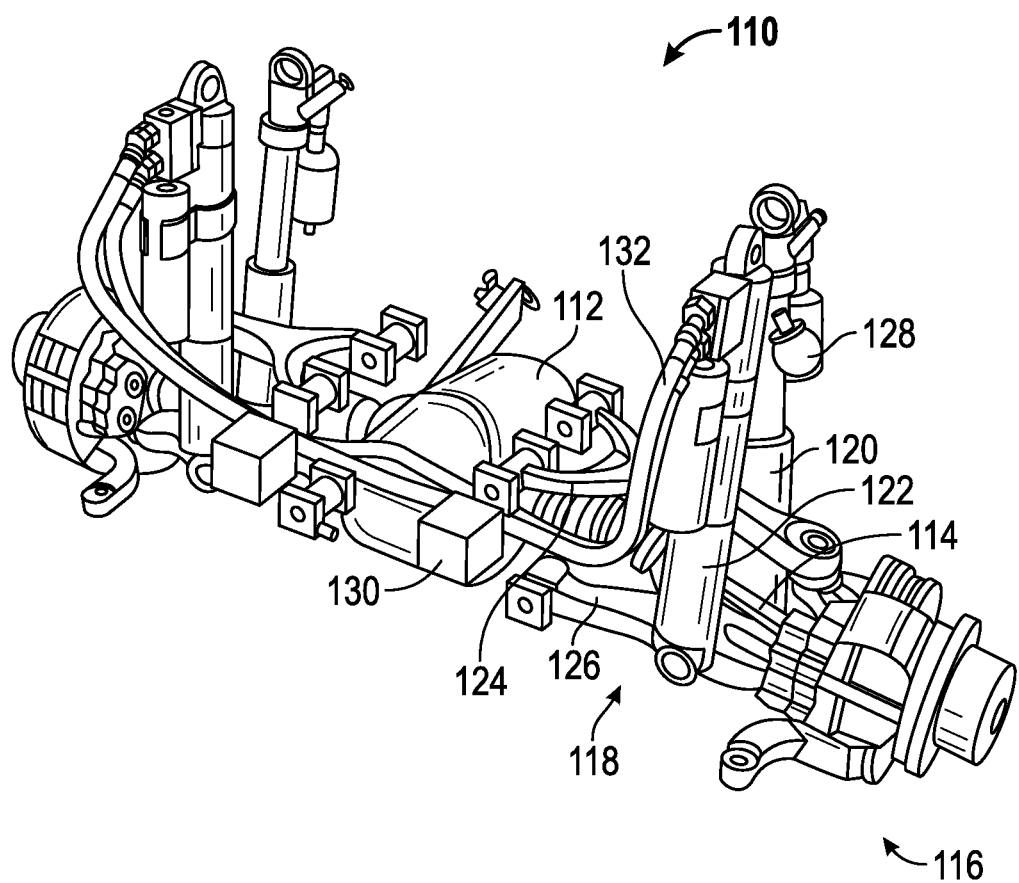
FIG. 1 is an elevation view of an axle assembly including a suspension system, according to an exemplary embodiment.

Referring to the exemplary embodiment shown in FIG. 1, an axle assembly 110 is configured to be included as part of a vehicle. The vehicle may be a military vehicle, a utility vehicle (e.g., a fire truck, a tractor, construction equipment, a sport utility vehicle, etc.), or still another type of vehicle. As shown in FIG. 1, axle assembly 110 includes a differential 112 coupled to a half shaft 114. As shown in FIG. 1, half shaft 114 is coupled to a wheel-end assembly 116. The wheel-end assembly 116 may include brakes, a gear reduction, steering components, a wheel hub, a wheel, a tire, and other features. According to an exemplary embodiment, the differential 112 is configured to be coupled with a drive shaft of the vehicle. Such a differential 112 may receive rotational energy from a prime mover (e.g., a diesel engine, a gasoline engine, an electric motor, etc.) of the vehicle. The differential 112 then allocates torque provided by the prime mover between the half shafts 114 of the axle assembly 110. The half shafts 114 deliver the rotational energy to each wheel-end assembly 116. According to an alternative embodiment, each wheel-end assembly 116 includes a prime mover (e.g., the axle assembly 110 includes electric motors that each drive one wheel).

According to an exemplary embodiment, the axle assembly 110 includes a suspension system 118 that couples the chassis of the vehicle to wheel-end assembly 116. In some embodiments, the chassis includes a pair of opposing frame rails, and the suspension system 118 engages the opposing frame rails through side plate assemblies. In other embodiments, the chassis is a hull, a capsule, or another type of structural member. According to an exemplary embodiment, the suspension system 118 includes a spring, shown as gas spring 120, and a damper, shown as hydraulic damper 122. As shown in FIG. 1, the gas spring 120 and the hydraulic damper 122 are coupled in parallel to a lower support member, shown as lower swing arm 126. According to an exemplary embodiment, the wheel-end assembly 116 is coupled to lower swing arm 126 and an upper support member, shown as upper swing arm 124.

According to an exemplary embodiment, the vehicle is configured for operation on both smooth (e.g., paved) and uneven (e.g., off-road, rough, etc.) terrain. As the vehicle travels over uneven terrain, the upper swing arm 124 and the lower swing arm 126 guide the vertical movement of the wheel-end assembly 116. A stop, shown as cushion 128, provides an upper bound to the movement of the wheel-end assembly 116. It should be understood that axle assembly 110 may include similar components (e.g., wheel-end assemblies, suspension assemblies, swing arms, etc.) for each of the two opposing lateral sides of a vehicle.

Figure 2:
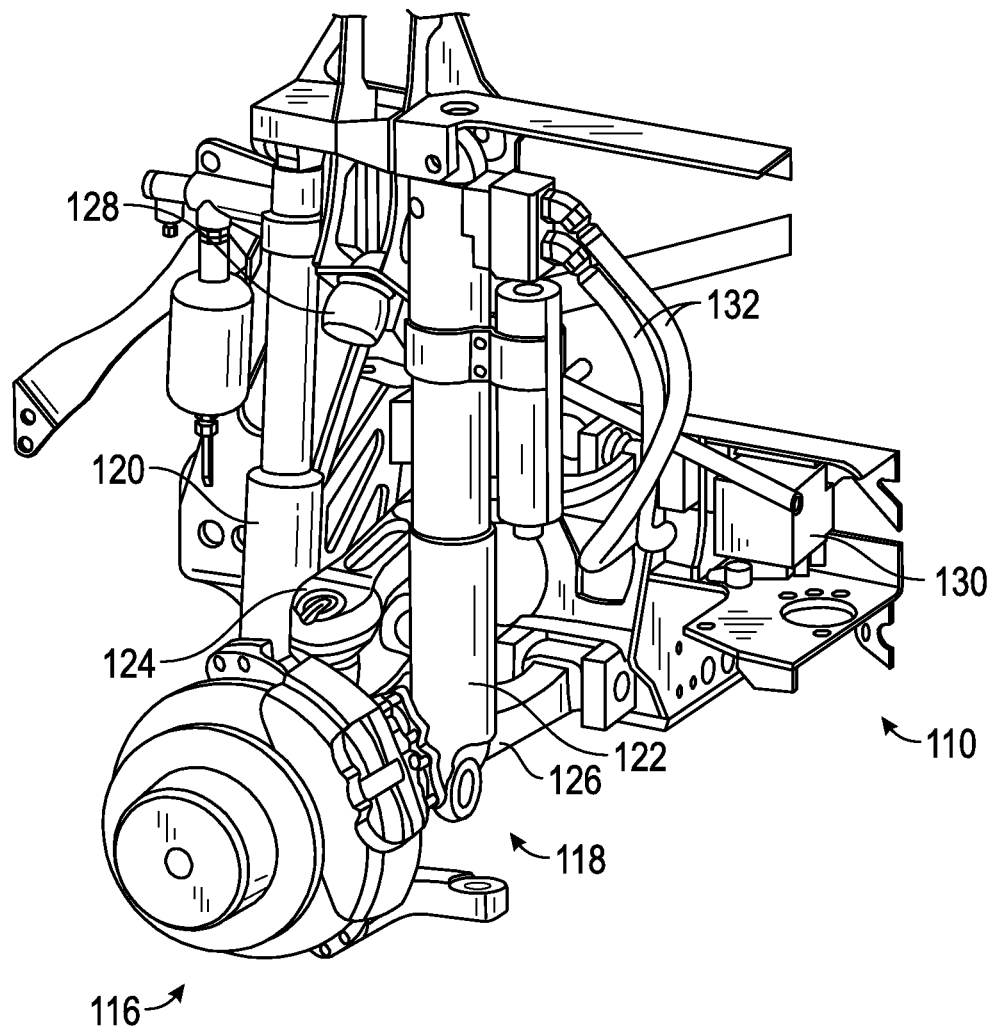
FIG. 2 is an elevation view of a suspension system an axle assembly, according to an exemplary embodiment.

Referring next to the exemplary embodiment shown in FIG. 2, the suspension system 118 includes various components configured to improve performance of the vehicle. As shown in FIG. 2, gas spring 120 is a high-pressure gas spring. According to an exemplary embodiment, the suspension system 118 includes a pump, shown as high-pressure gas pump 130, that is coupled to gas spring 120. In some embodiments, suspension system 118 includes a plurality of high-pressure gas pumps 130 each coupled to a separate gas spring 120. In other embodiments, the suspension system 118 includes fewer high-pressure gas pumps 130 than gas springs 120. According to an exemplary embodiment, the gas spring and the pump include gas made up of at least 90% inert gas (e.g., nitrogen, argon, helium, etc.). The gas may be stored, provided, or received in one or more reservoirs (e.g., tank, accumulators, etc.). During operation, the high-pressure gas pump 130 selectively provides gas, under pressure, to at least one of the gas spring 120 and the reservoir. In some embodiments, at least one of the gas springs 120 and the hydraulic dampers 122 receive and provide a fluid (e.g., gas, hydraulic fluid) to lift or lower the body of the vehicle with respect to the ground thereby changing the ride height of the vehicle.

Figure 3:
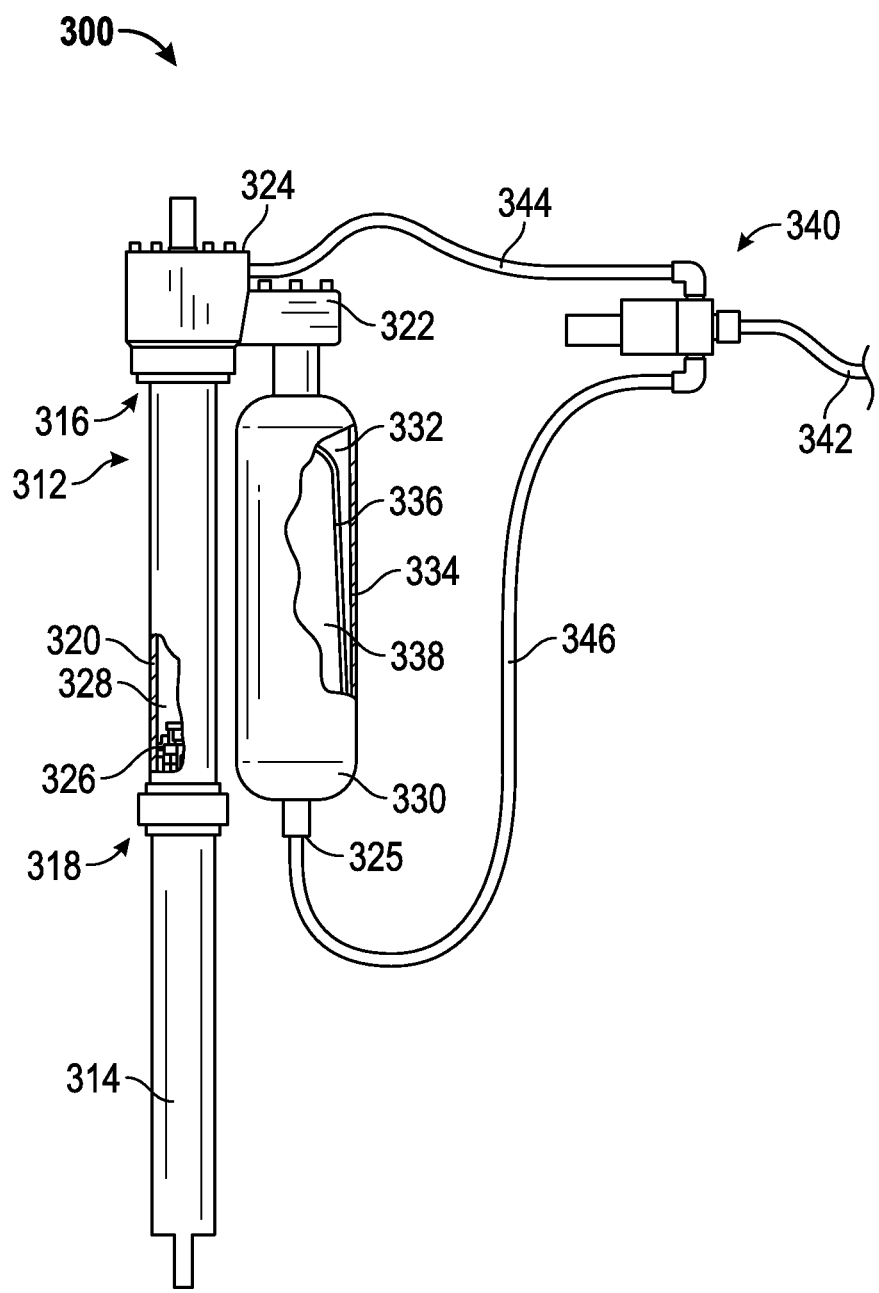
FIG. 3 is a side plan view of a gas spring and a valve assembly, according to an exemplary embodiment.

Referring next to the exemplary embodiment shown in FIG. 3, a spring, shown as gas spring 300, includes a tubular member 312 coupled to a rod 314. As shown in FIG. 3, tubular member 312 includes a sidewall 320, an end cap 316 that is coupled to a first end of sidewall 320, and a rod end 318 that is coupled to an opposing end of sidewall 320. According to an exemplary embodiment, sidewall 320 is cylindrical. According to an alternative embodiment, sidewall 320 has a different geometry (e.g., rectangular, square, hexagonal, etc.). A piston, shown as plunger 326, is coupled to an end of rod 314 and disposed within the inner volume of tubular member 312. A spring volume, shown as spring chamber 328, is formed within tubular member 312 by end cap 316, an inner surface of sidewall 320, and plunger 326. According to an alternative embodiment, spring chamber 328 is at least partially formed within a portion of rod 314. By way of example, spring chamber 328 may span both an inner volume between sidewall 320, end cap 316, and a face of plunger 326 and also an inner portion of rod 314.

According to an exemplary embodiment, a fluid (e.g., nitrogen, another gas, etc.) is disposed within spring chamber 328 of gas spring 300. It should be understood that gas spring 300 may be implemented as part of a vehicle suspension system. As the vehicle encounters an obstacle (e.g., a positive obstacle, a negative obstacle, etc.) a wheel-end and other components (e.g., a swing arm, etc.) of the vehicle suspension system translate vertically. According to an exemplary embodiment, rod 314 is coupled to the swing arm and tubular member 312 is coupled to the chassis (e.g., frame rail, hull, etc.) of the vehicle such that relative movement occurs between tubular member 312 and rod 314 as the vehicle encounters the obstacle. Such relative movement increases or decreases the pressure of the fluid within spring chamber 328 as gas spring is compressed or extended, respectively. Compression of gas spring 300 stores kinetic energy from rod 314 and other suspension components as potential energy in the fluid, and extension of gas spring 300 releases potential energy stored within the fluid. relative movement between tubular member 312 and rod 314 also changes the volume of spring chamber 328, according to an exemplary embodiment. The fluid in spring chamber 328 resists compression, thereby providing an opposing spring force. The magnitude of the opposing spring force is a function of the compressibility of the fluid, the area of the piston, the volume and geometry of the chamber, and an initial state (e.g., initial pressure) of the fluid, among other factors.

According to an exemplary embodiment, gas spring 300 includes a reservoir, shown as accumulator 330. As shown in FIG. 3, accumulator 330 is positioned proximate to the tubular member 312 and rod 314. Accumulator 330 includes a housing, shown as shell 334, that defines an inner volume, according to an exemplary embodiment. A flexible member, shown as bladder 336, separates the inner volume of shell 334 into a working volume, shown as working chamber 332, and a control volume, shown as control chamber 338. As shown in FIG. 3, working chamber 332 is formed by an inner surface of shell 334 and a first surface of bladder 336, and control chamber 338 is formed by an inner surface of shell 334 and a second, opposing surface of bladder 336. According to an exemplary embodiment, a conduit 322 couples accumulator 330 to tubular member 312. A flow passage extends through conduit 322 and couples spring chamber 328 of tubular member 312 to working chamber 332 of accumulator 330.

In some embodiments, spring chamber 328 is in gaseous communication with the working chamber 332 such that a continuous body of gas extends between spring chamber 328 and working chamber 332. No intermediate hydraulic fluid or mechanical element is included to transfer energy from the spring chamber 328 to the working chamber 332 or vice versa. In some such embodiments, the only hydraulic fluid associated with the gas spring 300 is a thin film between the rod and cylinder that moves during compression or extension of the rod 314. Use of the continuous body of gas for gaseous communication between spring chamber 328 and working chamber 332 is intended to reduce frictional losses associated with energy transfer between spring chamber 328 and working chamber 332, as may otherwise occur with hydraulic or mechanical intermediate elements. In other contemplated embodiments, hydraulic or mechanical intermediate elements may be used.

A flow control device (e.g., a check valve, a deflected disk valve, a poppet, etc.) may be positioned within conduit 322 to limit the flow of fluid between spring chamber 328 and working chamber 332. Such a flow control device may be selectively operable thereby allowing for the activation or deactivation of accumulator 330 (e.g., manually by a user, automatically as part of a control scheme, etc.). Spring chamber 328 is substantially sealed when such a flow control device is not open (e.g., to provide a gas spring having a first set of operating characteristics). According to an alternative embodiment, conduit 322 couples spring chamber 328 to another device (e.g., a pump, etc.). According to still another alternative embodiment, conduit 322 couples spring chamber 328 to accumulator 330 and another device. Gas spring 300 may have a single port that communicates with a pump and a reservoir or may have separate ports for each component.

According to an exemplary embodiment, shell 334 is a rigid member and bladder 336 is flexible. The fluid within control chamber 338 is pressurized (e.g., by a pump, through exposure to higher-pressure fluid from a reservoir, etc.) such that bladder 336 is inflated. According to an exemplary embodiment, bladder 336 remains inflated while the pressure of the fluid within control chamber 338 is greater than the pressure of the fluid within working chamber 332. Relative movement between tubular member 312 and rod 314 occurs as the vehicle encounters an obstacle. By way of example, the pressure of the fluid within spring chamber 328 increases as the vehicle encounters a positive obstacle.

According to an exemplary embodiment, the flow control device within conduit 322 is open or conduit 322 does not include a flow control device, and the pressures of the fluid within working chamber 332 and spring chamber 328 are approximately equal. Gas spring 300 responds to an input from an obstacle at a first spring rate where the pressure of the fluid within spring chamber 328 and working chamber 332 is less than the pressure of the fluid within control chamber 338 of accumulator 330. According to an exemplary embodiment, gas spring 300 responds to an input from an obstacle at a second spring rate where the pressure of the fluid within spring chamber 328 and working chamber 332 is greater than the pressure of the fluid within control chamber 338 of accumulator 330. Gas spring 300 having first and second spring rates is intended to reduce the peak forces on the vehicle thereby improving the ride quality and durability. According to an exemplary embodiment, the second spring rate is lower (i.e. softer, less harsh, etc.) than the first spring rate such that occupants within the vehicle are at least partially isolated from larger input forces. According to an exemplary embodiment, the threshold between the first spring rate and the second spring rate may be tuned to adjust the response of gas spring 300 for a particular vehicle or application.

The pressurized fluid within working chamber 332 overcomes the pressurized fluid within control chamber 338 thereby deflecting bladder 336, changing the volume of working chamber 332, and generating the second spring rate. The difference between the pressure of the fluid within working chamber 332 and control chamber 338 is specified to produce a spring force curve for gas spring 300 having particular characteristics (e.g., a particular force for which gas spring 300 transitions from the first spring rate to the second spring rate, etc.). According to an exemplary embodiment, the difference between the pressure of the fluid within working chamber 332 and control chamber 338 is approximately 48 pounds per square inch.

According to an exemplary embodiment, gas spring 300 and accumulator 330 are coupled to a valve assembly, shown as valve assembly 340. Valve assembly 340 facilitates increasing or decreasing the pressure within spring chamber 328 and working chamber 332. According to an exemplary embodiment, valve assembly 340 maintains the pressure differential between working chamber 332 and control chamber 338. The pressure differential between working chamber 332 and control chamber 338 affects the spring force response curve of gas spring 300 (e.g., the force where gas spring 300 changes from a first to a second spring rate). Valve assembly 340 maintains the pressure differential between the accumulator and gas spring to provide a consistent response curve gas spring 300 even under different operating temperatures, payloads, ride heights, or still other conditions. Maintaining the pressure differential while adding or removing fluid from spring chamber 328 accommodates changes to the ride height of the vehicle without jeopardizing ride quality or the preferred response curve of gas spring 300. It should be understood that such an increase or decrease in pressure may occur by increasing or decreasing the amount of fluid within spring chamber 328 and working chamber 332 (e.g., where the fluid is a compressible gas).

Various factors affect the ride height of a vehicle. By way of example, gas spring 300 may be filed to a first pressure with a first amount of fluid at a first temperature. Operating conditions of the vehicle (e.g., operating in an environment at a temperature below the first temperature, etc.) may alter the pressure of the fluid within spring chamber 328. The load of the vehicle may also impact the pressure of the fluid within spring chamber 328. By way of example, a greater payload may compress the gas spring to a pressure greater than an initial pressure. According to an exemplary embodiment, the pressure of the fluid within spring chamber 328 is adjustable to maintain a preferred ride height of the vehicle when operating under these or other conditions.

Valve assembly 340 is manually engageable, according to an exemplary embodiment. By way of example, an operator may interface with a controller (e.g., a switch, a lever, etc.) that is in communication with a flow control device (e.g., a solenoid, a valve, etc.) coupled to valve assembly 340. The operator may engage valve assembly 340 after identifying a change in the ride height (e.g., visually) or in response to an indication (e.g., from a warning light, etc.) of a vehicle characteristic (e.g., a ride height, payload, tire pressure, temperature, or other operating condition).

According to an alternative embodiment, valve assembly 340 is at least partially automatically controlled as part of a ride height control scheme. By way of example, a sensor (e.g., a ride height sensor, a temperature sensor, a tire pressure sensor, a spring pressure sensor, an accumulator pressure sensor, a payload sensor, etc.) may provide a sensor signal to a controller. The controller receives the sensor signal, evaluates whether to adjust the ride height, and provides a signal to a flow device (e.g., a pump, a solenoid, a valve, etc.) configured to increase or decrease the pressure within spring chamber 328. According to an exemplary embodiment, the controller operates on a continuous feedback loop thereby continuously monitoring and regulating the ride height of the vehicle. According to an alternative embodiment, the controller monitors the ride height of the vehicle at discrete time intervals (e.g., multiple times a day, before a shift, after a shift, after a change in payload, etc.). According to still another alternative embodiment, valve assembly 340 is automatically controlled under normal operating conditions but includes a manual override (e.g., to allow for compression of gas spring 300 during transportation of the vehicle, to increase the ride height to traverse rough terrain, etc.).

As shown in FIG. 3, valve assembly 340 is coupled to a fluid device (e.g., a pump, a reservoir, etc.) with a first line 342. It should be understood that valve assembly 340 may receive pressurized fluid flow from the fluid device while increasing the ride height or may provide pressurized flow from gas spring 300 while lowering the ride height. The fluid device may be selectively coupled to control chamber 338 to establish an initial pressure of control chamber 338 (e.g., a pressure that relates to the force where gas spring 300 transitions from the first spring rate to the second spring rate). According to an exemplary embodiment, the fluid device increases the pressure of the fluid within control chamber 338 thereby increasing the force required for gas spring 300 to provide the second spring rate. According to an alternative embodiment, the fluid device decreases the pressure of the fluid within control chamber 338 thereby reducing the force required for gas spring 300 to provide the second spring rate.

Valve assembly 340 may be also coupled to a port 324 of gas spring 300 with a second line 344. According to an exemplary embodiment, port 324 is in fluid communication with spring chamber 328 of tubular member 312 and working chamber 332 of accumulator 330. As shown in FIG. 3, valve assembly 340 is coupled to a port 325 of accumulator 330 with a third line 346. According to an exemplary embodiment, port 325 is in fluid communication with control chamber 338 of accumulator 330. It should be understood that various internal chambers of valve assembly 340 are in fluid communication with spring chamber 328, working chamber 332, and control chamber 338 through second line 344 and third line 346. According to an alternative embodiment, the valve assembly is integrated with the gas spring (e.g., to the base) thereby reducing the need for intermediate piping. According to still another alternative embodiment, the piping is integrally formed with the gas spring to allow for differential placement of the valve assembly.

Figure 4:
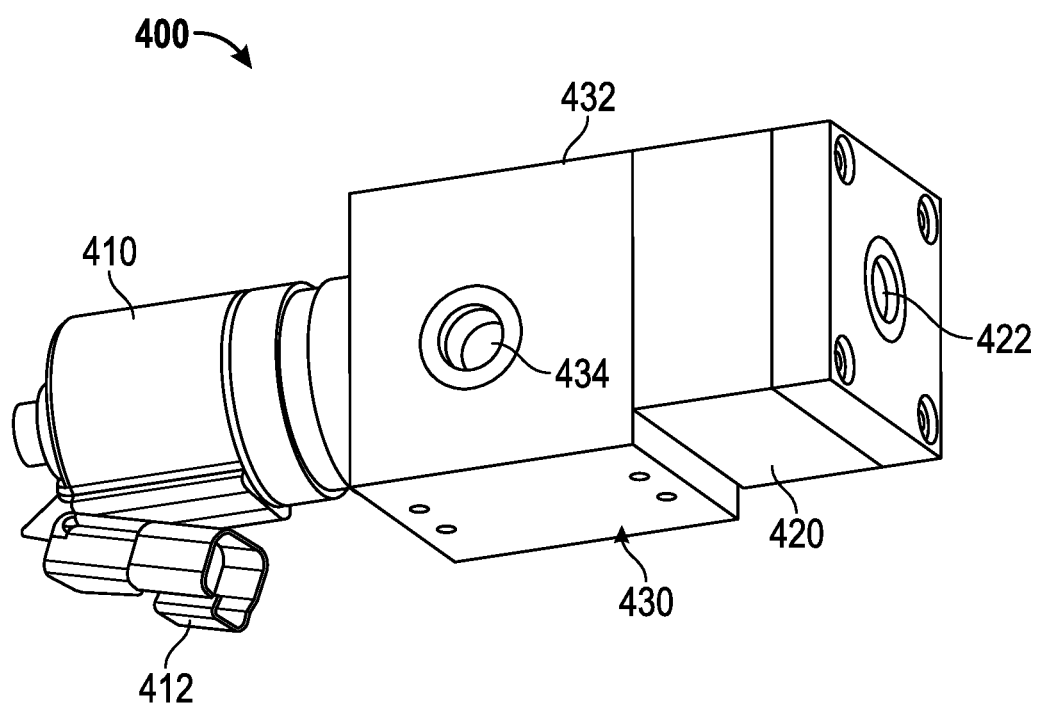
FIG. 4 is an elevation view of a valve assembly, according to an exemplary embodiment.

Referring next to the exemplary embodiment shown in FIG. 4, a valve assembly, shown as valve assembly 400, includes a solenoid 410, a solenoid block 420, and a valve block 430. According to an alternative embodiment, valve assembly 400 does not include solenoid 410. The solenoid block 420 includes an input 412 that sends and receives electrical signals. As shown in FIG. 4, solenoid block 420 includes an input 422 configured to interface with a flow device (e.g., a pump, a reservoir, etc.). Valve block 430 includes body member 432 that defines an aperture, shown as port 434. According to an exemplary embodiment, port 434 engages an internal chamber of a spring (e.g., a gas spring). Valve block 430 may further define a second aperture configured to engage a control chamber of an accumulator. According to an exemplary embodiment, valve assembly 400 includes an arrangement of individual check valves that provide a pressure offset between a plurality of output ports. The valve assembly 400 may be implemented as part of a vehicle suspension system to maintain a pressure differential between different components (e.g., the control chamber of a reservoir and an internal chamber of a gas spring). According to an exemplary embodiment, a constant pressure differential during ride height adjustments facilitates the consistent application of the second spring rate by the gas spring.

According to the exemplary embodiment shown in FIGS. 5-11, a valve assembly, shown as valve assembly 500, includes a valve body 510 that defines a first port, shown as accumulator port 520, a second port, shown as spring port 530, and a third port, shown as flow device port 540. Accumulator port 520 is configured to be coupled to a control chamber of a gas spring reservoir, spring port 530 is configured to be coupled to a spring chamber of the gas spring, and flow device port is configured to be coupled to a flow device (e.g., pump, reservoir, etc.), according to an exemplary embodiment. Such coupling may occur with intermediate lines. According to an alternative embodiment, valve body 510 of valve assembly 500 may be coupled (e.g., bolted, welded, integrally formed with) a gas spring. The gas spring may include internal flow passages that place the various ports and components of valve assembly 500 in fluid communication with the spring chamber and the control chamber, or external lines may otherwise couple valve assembly 500 with the gas spring, according to various alternative embodiments. According to an exemplary embodiment, accumulator port 520, spring port 530, and flow device port 540 are marked with a marking or indicia (e.g., a stamp, a label, etc.) that indicates which line to couple with the particular port of valve assembly 500.

Figure 5:
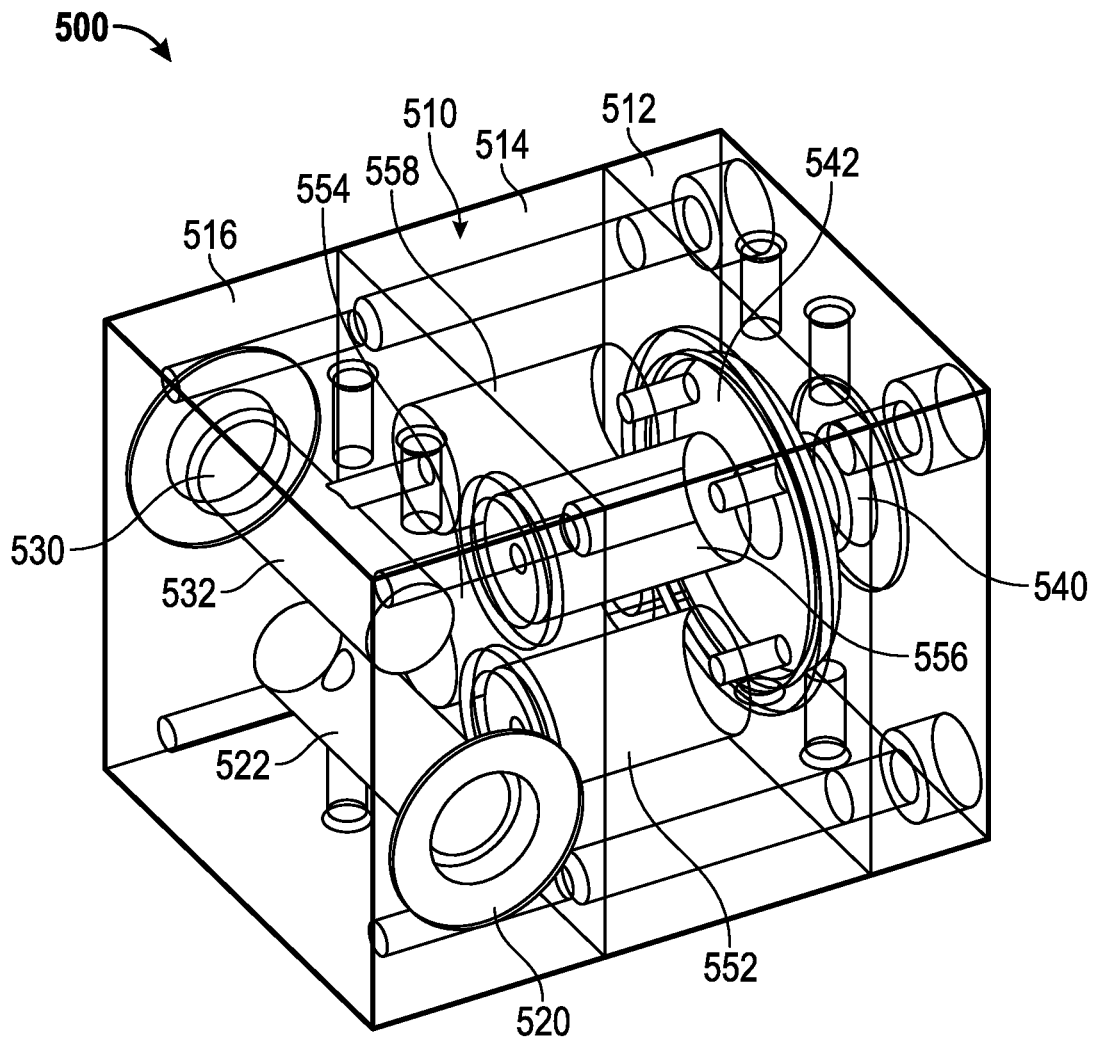
FIGS. 5-7 are elevation views of a valve assembly defining a plurality of flow paths, according to an exemplary embodiment.
Figure 6:
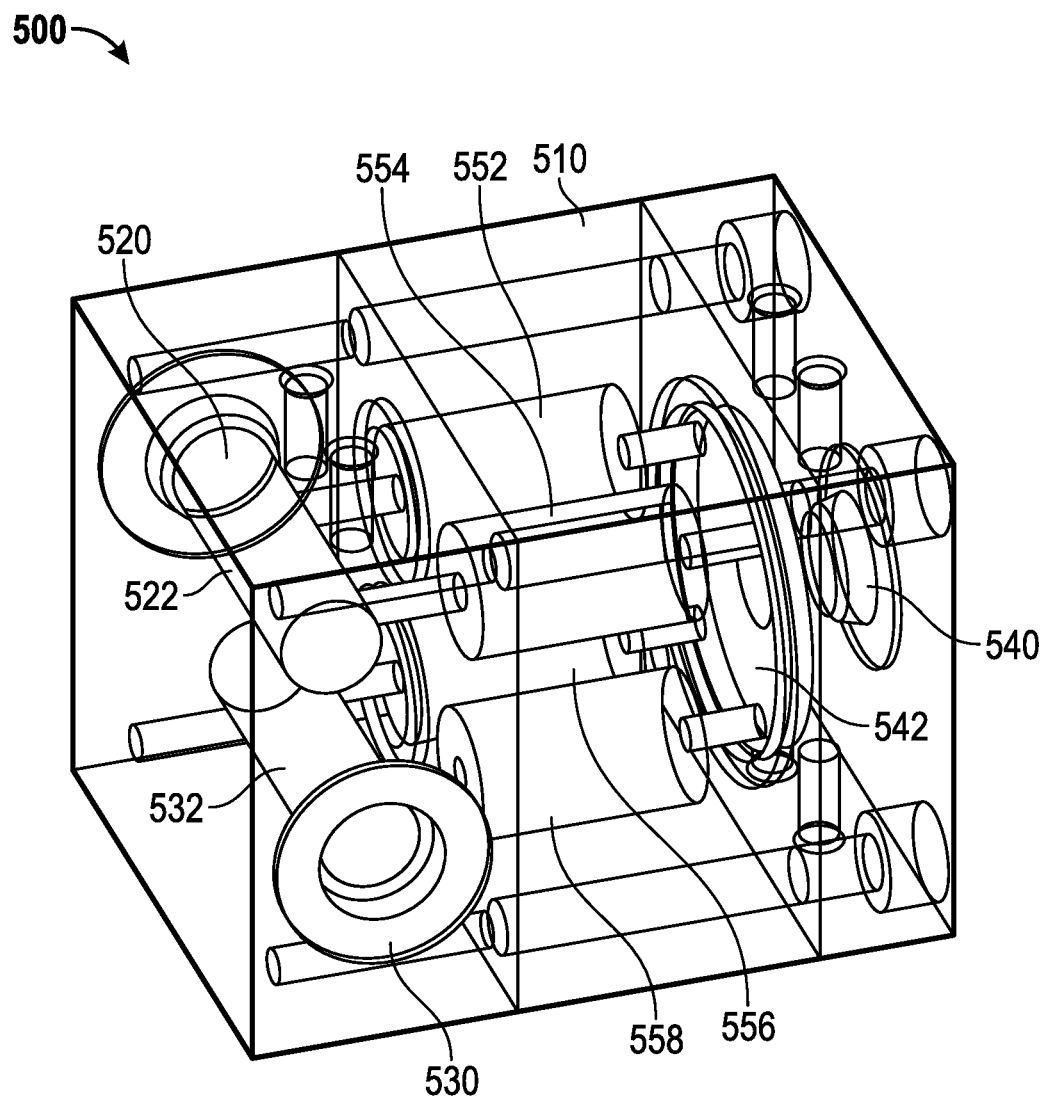
Figure 7:
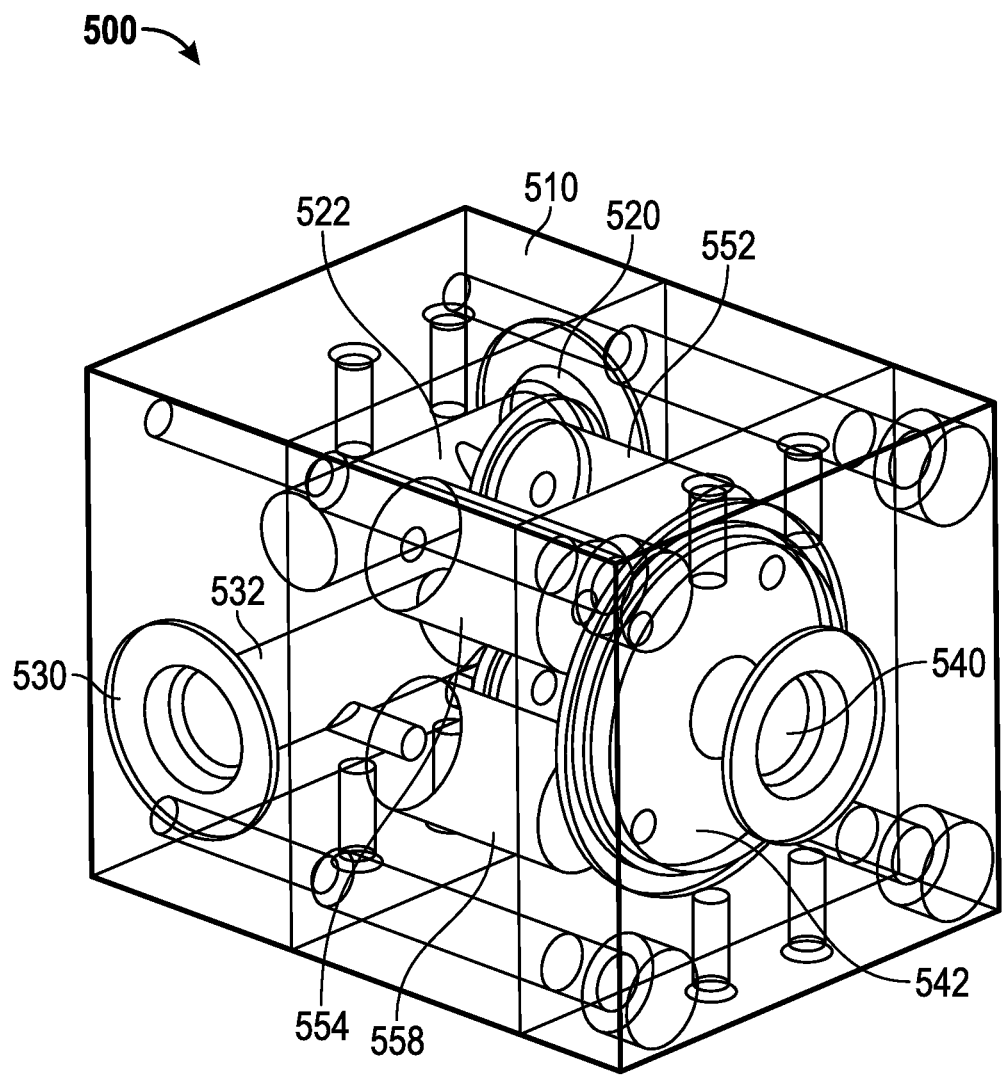
Figure 8:
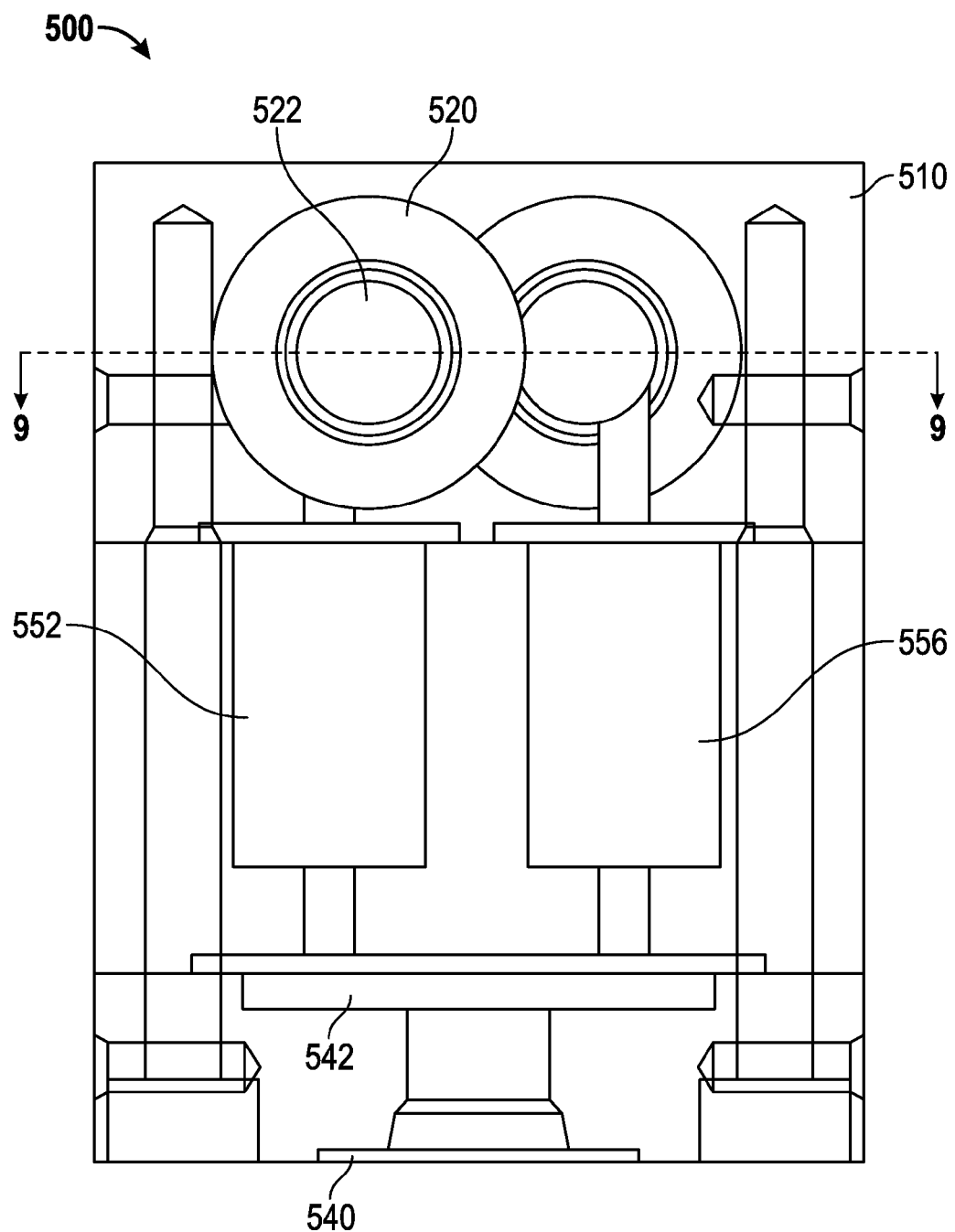
FIG. 8 is a plan view of a valve assembly, according to an exemplary embodiment.
Figure 9:
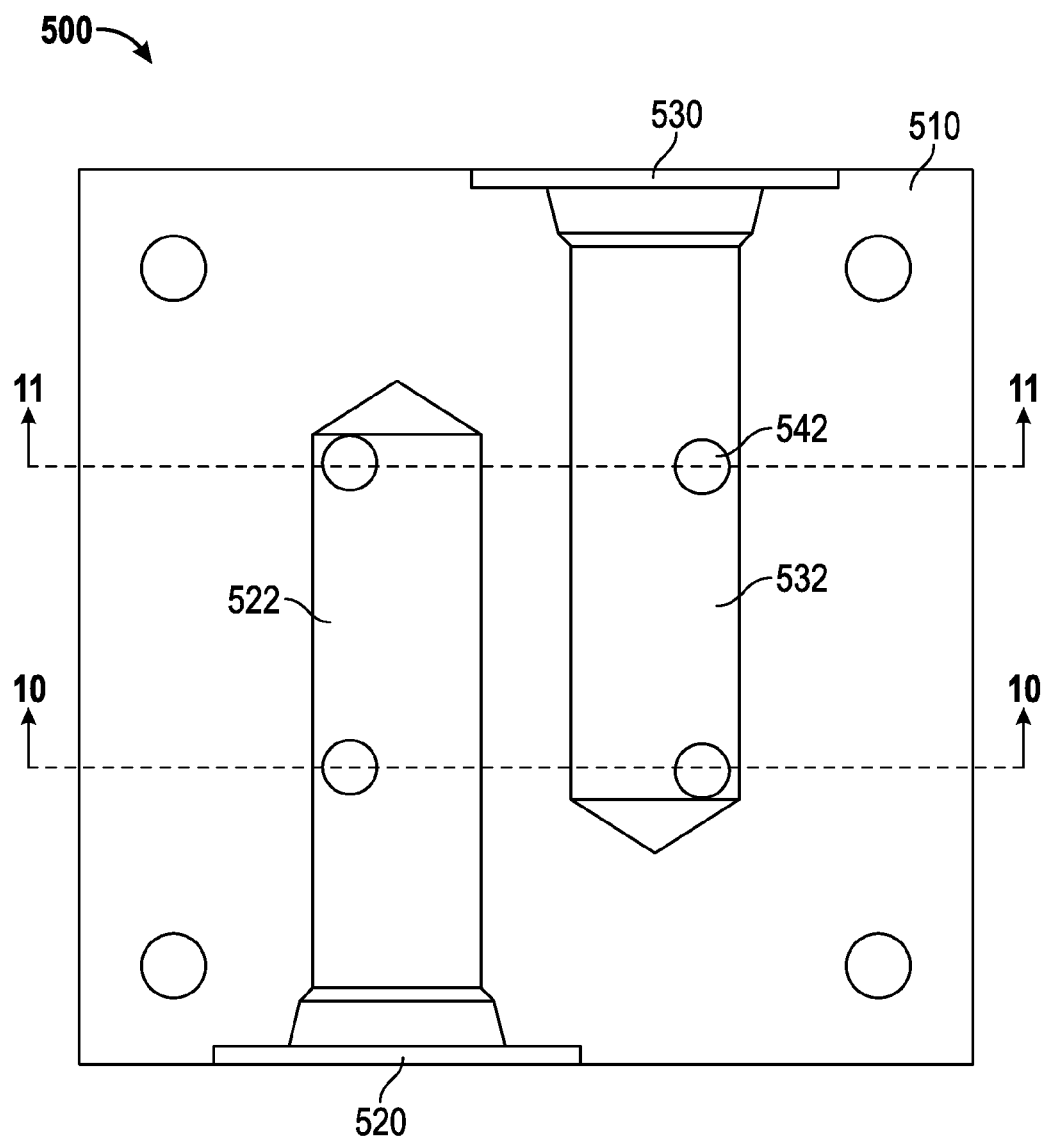
FIGS. 9-11 are sectional views of a valve assembly, according to an exemplary embodiment.

Referring again to FIGS. 5-11, valve assembly 500 includes a plurality of check valves positioned within valve body 510. According to an exemplary embodiment, valve assembly 500 includes a first check valve 552, a second check valve 554, a third check valve 556, and a fourth check valve 558. As shown in FIGS. 5-7, first check valve 552 and second check valve 554 are positioned along a flow path between flow device port 540 and an accumulator manifold 522. Accumulator manifold 522 extends through valve body 510 and is in fluid communication with accumulator port 520. As shown in FIGS. 5-7, third check valve 556 and fourth check valve 558 are positioned along a flow path between flow device port 540 and a spring manifold 532. Spring manifold 532 extends through valve body 510 and is fluid communication with spring port 530. As shown in FIGS. 5-7, flow device port is in fluid communication with each of first check valve 552, second check valve 554, third check valve 556, and fourth check valve 558 via a common flow device manifold 542.

According to an exemplary embodiment, first check valve 552, second check valve 554, third check valve 556, and fourth check valve 558 are arranged in a parallel check valve circuit. First check valve 552, second check valve 554, third check valve 556, and fourth check valve 558 provide a pressure offset between accumulator port 520 and spring port 530. According to an exemplary embodiment, first check valve 552 and fourth check valve 558 have a first crack pressure whereas second check valve 554 and third check valve 556 have a second crack pressure. It should be understood that check valves are biased toward a closed position. Application of a fluid having a pressure greater than the crack pressure for the check valve opens the check valve and allows a fluid to flow therethrough. According to an exemplary embodiment, the second crack pressure is greater than the first crack pressure. By way of example, the first crack pressure may be two pounds per square inch and the second crack pressure may be fifty pounds per square inch. The differential between the first crack pressure and the second crack pressure is related (e.g., equal) to a difference in the fluid pressure at accumulator port 520 and spring port 530.

Figure 11:
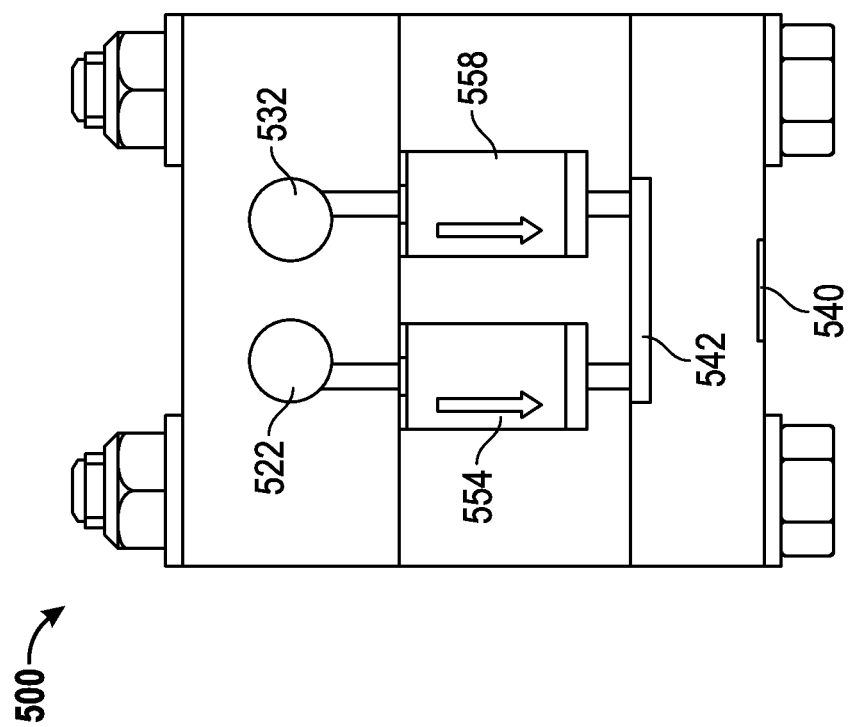
Figure 10:
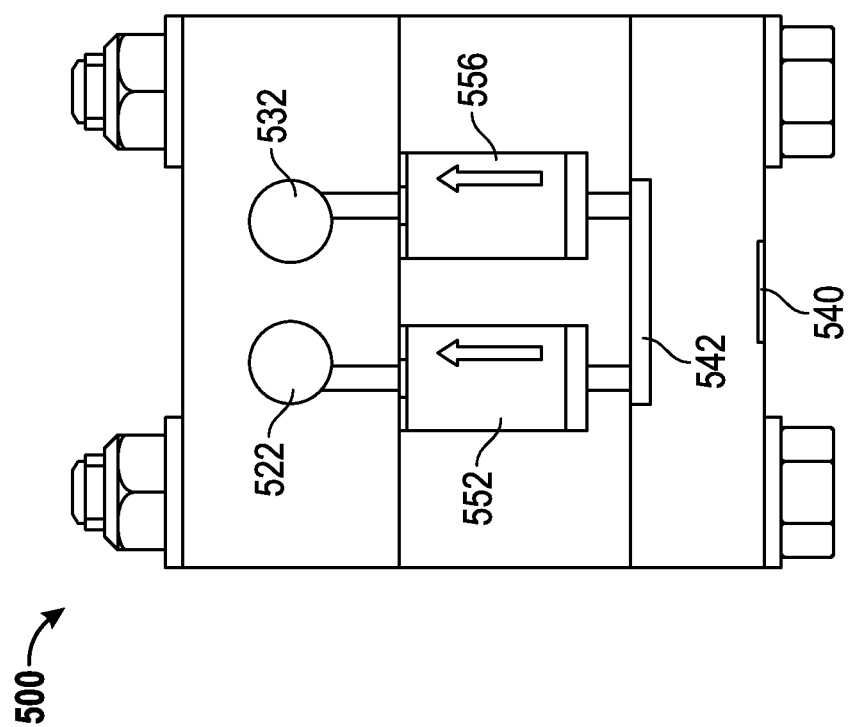

Referring again to the exemplary embodiment shown in FIGS. 10-11, first check valve 552, second check valve 554, third check valve 556, and fourth check valve 558 are unidirectional such that flow occurs through each check valve only along an orientation direction. As shown in FIGS. 10-11, first check valve 552 is positioned to allow fluid flow from flow device manifold 542 to accumulator manifold 522; second check valve 554 is positioned to allow fluid flow from accumulator manifold 522 to flow device manifold 542; third check valve 556 is positioned to allow fluid flow from flow device manifold 542 to spring manifold 532; and fourth check valve 558 is positioned to allow fluid flow from spring manifold 532 to flow device manifold 542.

Referring again to the exemplary embodiment shown in FIG. 5, valve body 510 includes a plurality of subcomponents coupled together with fasteners (e.g., bolts, screws, etc.). According to an alternative embodiment, the subcomponents may be otherwise coupled together (e.g., welded, adhesively secured, etc.). According to an exemplary embodiment, valve body 510 includes a first body portion, shown as flow device portion 512, a second body portion, shown as check valve portion 514, and a third body portion, shown as port portion 516. The plurality of subcomponents may facilitate manufacturing and maintenance of valve assembly 500. According to an exemplary embodiment, flow device manifold 542 is defined (e.g., machined, cut, etc.) into flow device portion 512, apertures are defined for the check valves within check valve portion 514, and the manifolds are defined within port portion 516. The check valves are positioned within the corresponding apertures within check valve portion 514, and the fasteners are positioned within apertures (e.g., threaded holes, etc.) to secure the subcomponents of valve body 510 together. A seal or a sealing compound may be positioned between adjacent faces of the various subcomponents to prevent pressurized fluid from leaking out of valve body 510.

Figure 12:
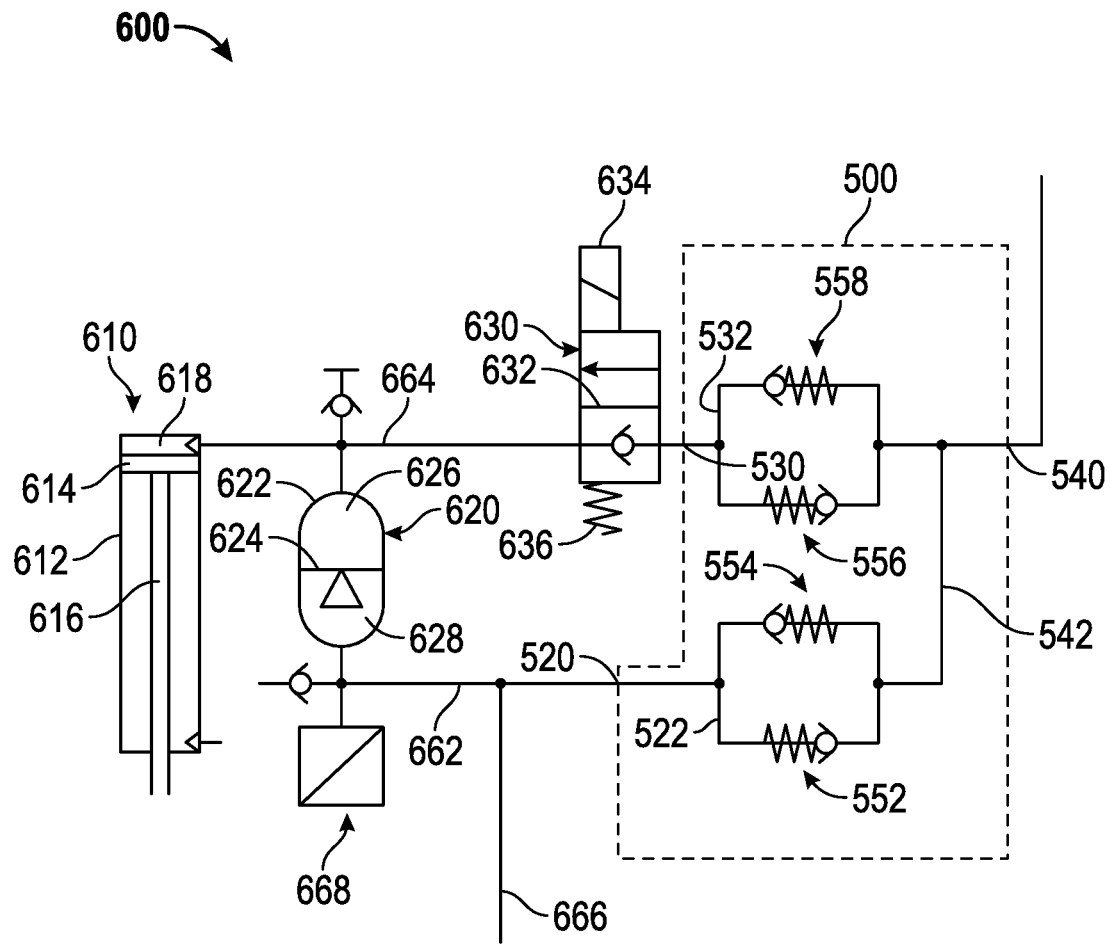
FIGS. 12-14 are schematic views of a suspension assembly having a gas spring and a valve assembly, according to an exemplary embodiment.
Figure 13:
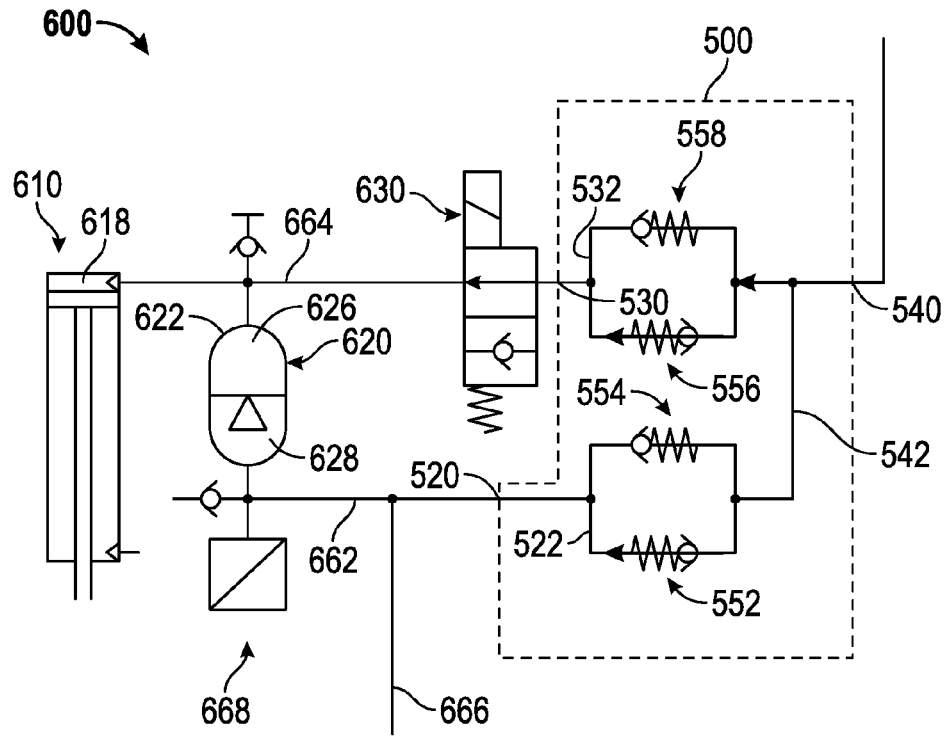
Figure 14:
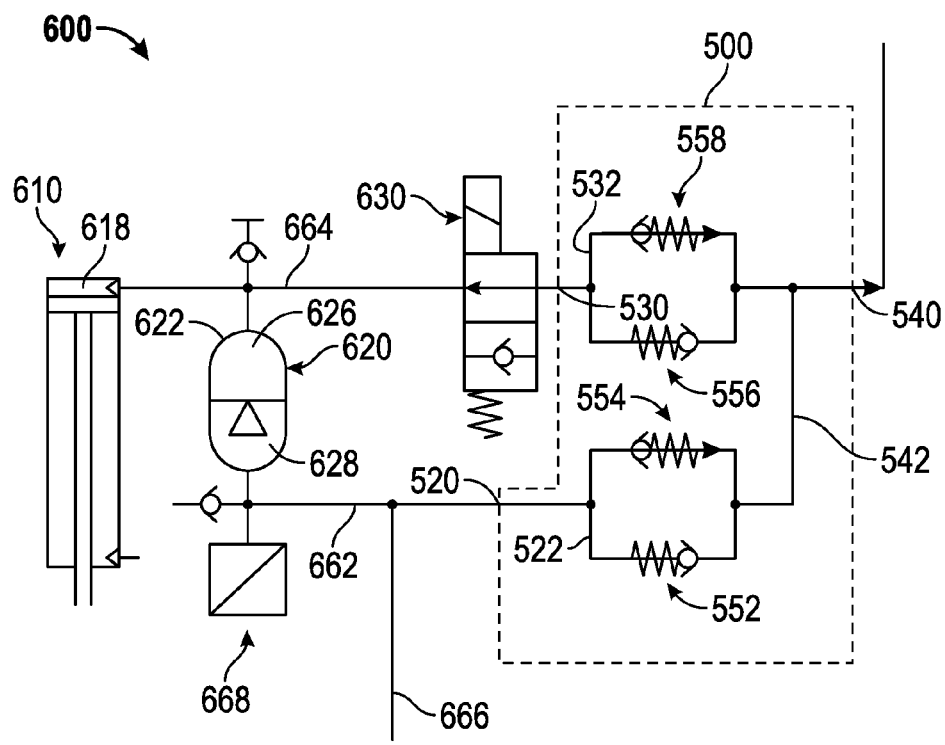

Referring next to the exemplary embodiment shown in FIGS. 12-14, a vehicle suspension, shown as vehicle suspension 600 includes valve assembly 500; a spring, shown as gas spring 610; a reservoir, shown as accumulator 620; and a flow control valve, shown as solenoid assembly 630. As shown in FIG. 12, gas spring 610 includes a tubular member 612, a plunger 614 positioned within tubular member 612, and a rod coupled to plunger 614 and extending through an end of tubular member 612. According to an exemplary embodiment, gas spring 610 is coupled to the chassis (e.g., frame rail, hull, etc.) and a moveable suspension component (e.g., a wheel-end, etc.). As shown in FIG. 12, an inner portion of tubular member 612 and plunger 614 define a spring chamber 618. According to an exemplary embodiment, accumulator 620 includes a housing 622 and a bladder 624. Bladder 624 separates an inner volume of housing 622 into a working chamber 626 and a control chamber 628. Accumulator port 520 is coupled to control chamber 628 of accumulator 620 with a line 662, and spring port 530 is coupled to spring chamber 618 and working chamber 626 with a line 664. It should be understood that valve assembly 500 is in fluid communication with accumulator 620 and gas spring 610 via line 662 and line 664. According to an exemplary embodiment, a third line 666 couples valve assembly 500 to a second gas spring such that valve assembly 500 may maintain a pressure differential for multiple gas spring assemblies. As shown in FIGS. 12-14, a pressure transducer 668 allows for the release of pressure from line 662 (e.g., for service).

According to an exemplary embodiment, solenoid assembly 630 comprises a two position directional control valve that includes a valve gate 632, an actuator 634, and a biasing member 636 (e.g., a spring, etc.). Biasing member 636 applies a biasing force and positions valve gate 632 toward a first position where a check valve obstructs fluid flow from valve assembly 500 toward gas spring 610. Actuator 634 is configured to overcome the biasing force applied by biasing member 636 and actuate valve gate 632 into a second position. Fluid flow may occur between valve assembly 500 and gas spring 610 when valve gate 632 is in the second position, according to an exemplary embodiment. Solenoid assembly 630 normally acts as a check valve to prevent fluid that may otherwise flow from control chamber 628 through valve assembly 500 and into spring chamber 618 along an undesired short circuit.

According to an exemplary embodiment, the pressure of the fluid within control chamber 628 is greater than the pressure of fluid within spring chamber 618. As plunger 614 and rod 616 extend within tubular member 612, the pressure of the fluid within spring chamber 618 decreases. Where the pressure within spring chamber 618 is greatly reduced (e.g., during full rebound) and the fluid within control chamber 628 is pressurized, the pressurized fluid from control chamber 628 may flow through line 662, overcome the crack pressure of second check valve 554, flow through flow device manifold 542, overcome the crack pressure of third check valve 556, and flow into spring chamber 618 through line 664 (i.e. pressurized fluid from control chamber 628 may short circuit across the larger crack pressure check valves and into spring chamber 618). According to an exemplary embodiment, solenoid assembly 630 prevents such flow.

According to the exemplary embodiment shown in FIG. 13, the ride height of the vehicle is elevated by the application of pressurized fluid to flow device port 540. The ride height of the vehicle may be increased by increasing the pressure of the fluid within spring chamber 618. According to an exemplary embodiment, valve assembly 500 facilitates increasing the pressure of the fluid within spring chamber 618 while maintaining the pressure differential between spring chamber 618 and control chamber 628. According to an exemplary embodiment, the pressure of the fluid within control chamber 628 is greater than the pressure of the fluid within spring chamber 618. Such an increase in the ride height of the vehicle may occur to compensate for an increase in the sprung weight of the vehicle (e.g., an increased payload, etc.), a decrease in temperature of the operating environment (e.g., the vehicle travels to a location having a decreased temperature), in order to prepare the vehicle for transport, or for still another reason.

As shown in FIG. 13, the ride height of the vehicle is increased by applying a fluid having a pressure that is greater than the pressure of the fluid within spring chamber 618 (i.e. a high pressure fluid) to flow device port 540. According to an exemplary embodiment, the initial pressure of the fluid within spring chamber 618 is 1,000 pounds per square inch and the fluid applied to flow device port 540 has a pressure of 1,100 pounds per square inch. The pressurized fluid flows into flow device manifold 542 where it interacts with first check valve 552, second check valve 554, third check valve 556, and fourth check valve 558. According to an exemplary embodiment first check valve 552 and third check valve 556 have an orientation direction that allows fluid to flow only from flow device manifold 542 to spring manifold 532 and accumulator manifold 522. The high pressure fluid (e.g., 1,100 pounds per square inch) overcomes the crack pressures of first check valve 552 (e.g., 2 pounds per square inch) and third check valve 556 (e.g., 50 pounds per square inch) and flows into spring manifold 532 and accumulator manifold 522. The pressure of the fluid within spring manifold 532 and accumulator manifold 522 may be lower than the pressure of the fluid at flow device manifold 542 due to interaction with the check valves.

According to an exemplary embodiment, the pressure of the fluid within spring manifold 532 and accumulator manifold 522 is reduced by an amount equal to the crack pressure of third check valve 556 and first check valve 552, respectively. By way of example, a fluid pressure of 1,100 pounds per square inch may be reduced to 1,050 pounds per square inch at spring manifold 532 where third check valve 556 has a crack pressure of 50 pounds per square inch and reduced to 1,098 pounds per square inch at accumulator manifold 522 where first check valve 552 has a crack pressure of 2 pounds per square inch. According to an exemplary embodiment, the differential in pressures between spring manifold 532 and accumulator manifold 522 maintains a pressure differential between spring chamber 618 and control chamber 628 while providing fluid flow into both chambers (e.g., to raise the ride height of the vehicle). According to an alternative embodiment, the differential in pressures between spring manifold 532 and accumulator manifold 522 increases the pressure (i.e. charges) within spring chamber 618 and control chamber 628 while maintaining a preferred pressure offset (e.g., 48 pounds per square inch).

Referring next to the exemplary embodiment shown in FIG. 14, the ride height of the vehicle is reduced by the application of a low pressure fluid to flow device port 540. The ride height of the vehicle may be lowered by decreasing the pressure of the fluid within spring chamber 618. According to an exemplary embodiment, valve assembly 500 facilitates decreasing the pressure of the fluid within spring chamber 618 while maintaining the pressure differential between spring chamber 618 and control chamber 628. Such a reduction in the ride height of the vehicle may occur to compensate for a decrease in the sprung weight of the vehicle (e.g., a decreased payload, etc.), an increase in temperature of the operating environment (e.g., the vehicle travels to a location having a decreased temperature), in order to ready the vehicle after transport, or for still another reason.

As shown in FIG. 14, the ride height of the vehicle is decreased by exposing flow device port 540 to a fluid having a pressure lower than the pressure of the fluid within spring chamber 618 (i.e. a low pressure fluid). According to an exemplary embodiment, the initial pressure of the fluid within spring chamber 618 is 1,000 pounds per square inch and the fluid applied to flow device port 540 has a pressure of 900 pounds per square inch. The pressurized fluid from spring chamber 618 interacts with third check valve 556 and fourth check valve 558, and the pressurized fluid from control chamber interacts with first check valve 552 and second check valve 554. According to an exemplary embodiment, second check valve 554 and fourth check valve 558 have an orientation direction that allows fluid to flow only from spring manifold 532 and accumulator manifold 522 to flow device manifold 542. The high-pressure fluid from spring chamber 618 and control chamber 628 overcomes the crack pressure of second check valve 554 (e.g., 50 pounds per square inch) and fourth check valve 558 (e.g., 2 pounds per square inch) and flows out flow device port 540 through flow device manifold 542. The pressure of the fluid within spring chamber 618 is reduced thereby lowering the ride height of the vehicle. According to an exemplary embodiment, valve assembly 500 reduces pressure of the fluid within spring chamber 618 while maintaining the offset pressure between spring chamber 618 and control chamber 628 (e.g., a pressure offset of 48 pounds per square inch).

According to an exemplary embodiment, actuation of solenoid assembly 630 and the application of a fluid having preferred characteristics (e.g., a low pressure, a high pressure, etc.) to flow device port 540 occurs electronically. By way of example, a controller may send a signal to solenoid assembly 630. The controller may also send a signal to engage a fluid pump, a flow valve disposed between a reservoir and flow device port 540, or otherwise interact with another component. Upon actuation, the pump or valve are configured to expose flow device port 540 to the fluid having the appropriate characteristics (e.g., high pressure fluid to increase the ride height, low pressure fluid to decrease the ride height, etc.). According to an exemplary embodiment, the electronic control occurs as part of a ride height control scheme. A controller evaluates signals from a ride height, temperature, load, pressure, or other type of sensor and determines whether the ride height is within a preferred range (e.g., as specified in a parameter either upon initial manufacture, as specified in a parameter by an operator, etc.). According to an alternative embodiment, the electronic control system includes an operator input. By way of example an operator may engage a switch that is coupled to a controller, the controller configured to evaluate signals from the switch and send signals to actuate the fluid pump, flow valve, or other device. According to still another alternative embodiment, an operator manually engages solenoid assembly 630 (e.g., by pressing a button positioned thereon) and manually interacts with the pump, valve, or other device to expose flow device port 540 to the fluid having the appropriate characteristics.

Figure 15:
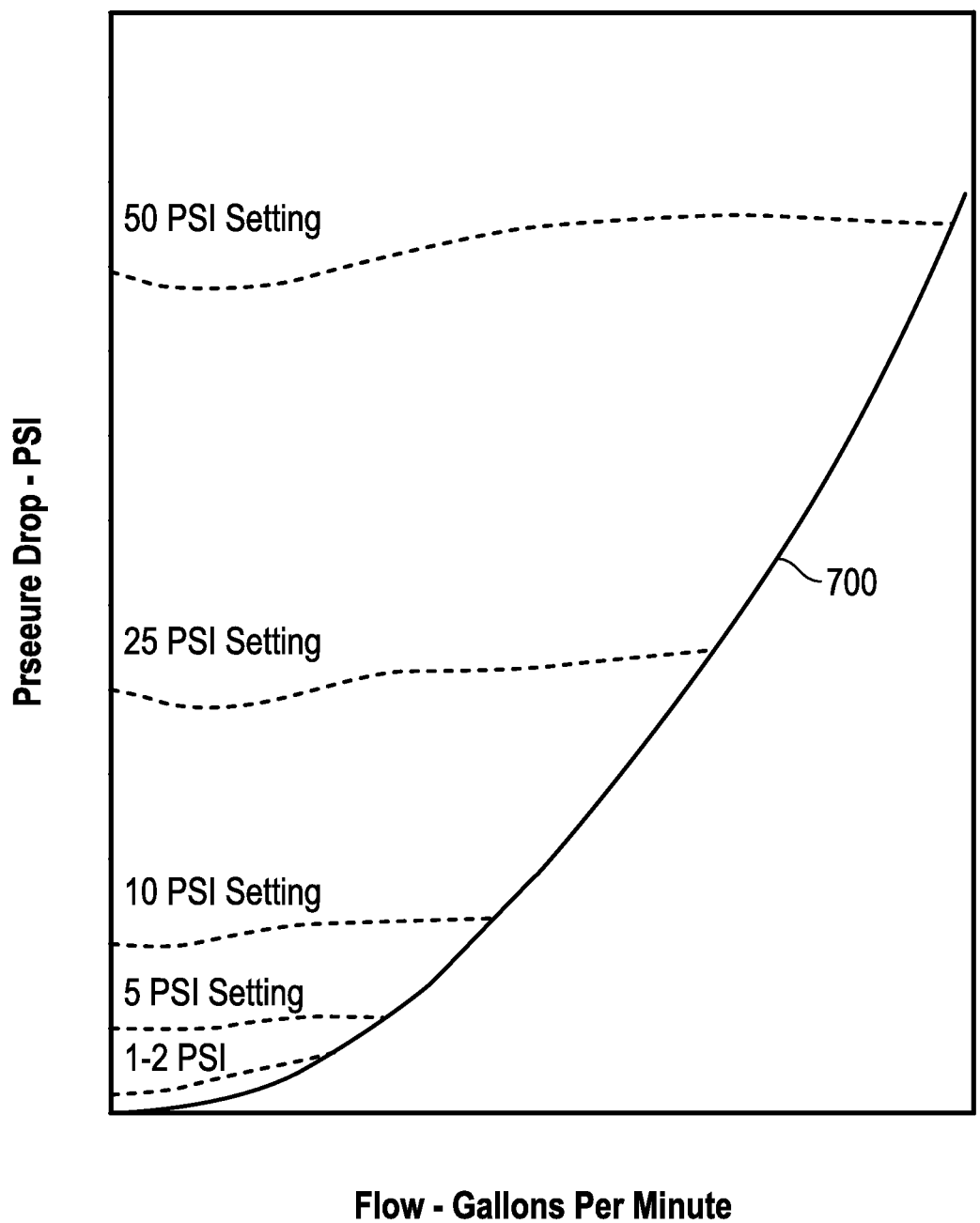
FIG. 15 is a schematic diagram of pressure drop versus flow rate for a check valve, according to an exemplary embodiment.

As shown in FIG. 15, the pressure drop of a fluid flow through first check valve 552, second check valve 554, third check valve 556, and fourth check valve 558 is related to the flow rate of the fluid. It should be understood that the flow rate of the fluid may be regulated in various ways and is related to a pressure differential, among other characteristics of the fluid applied to the flow device port. For flow rates below an orifice line 700, the pressure drop of a fluid flowing through valve having a crack pressure of 50 pounds per square inch is approximately 50 pounds per square inch (e.g., within 5 pounds per square inch). In this region, the pressure drop remains approximately constant for different flow rates. According to an exemplary embodiment, a vehicle suspension system provides a fluid flow into a flow device port of a valve assembly at a flow rate below orifice line 700 such that the valve assembly provides a predetermined pressure offset (e.g., 48 pounds per square inch). According to an exemplary embodiment, first check valve 552 and fourth check valve 558 have a crack pressure and corresponding pressure drop of two pounds per square inch and second check valve 554 and third check valve 556 have a crack pressure and corresponding pressure drop of fifty pounds per square inch. The valve assembly may include check valves having still other crack pressures and corresponding pressure drops to provide still other pressure offsets between two chambers (e.g., a spring chamber and a control chamber, etc.).

In still another contemplated embodiment, a gas spring further includes at least one port that may be opened to allow another fluid (e.g., hydraulic oil, water, etc.) to be provided to or from an internal volume of the gas spring. The internal volume for hydraulic fluid is separated from the spring chamber that contains gas. In such contemplated embodiments, adding or removing hydraulic fluid from the internal volume changes the overall length of the gas spring and may also increase or decrease the ride height of the vehicle.

The construction and arrangements of the damper, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements, the position of elements may be reversed or otherwise varied, and the nature or number of discrete elements or positions may be altered or varied. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed is:

1. A suspension assembly for a vehicle, comprising:
  a gas spring, comprising:
    a tubular housing;
    a plunger positioned within the tubular housing, the plunger and an inner surface of the tubular housing defining a spring volume;
    a reservoir including a housing that defines an inner volume and a flexible member coupled to the housing, the flexible member separating the inner volume into a working volume and a control volume; and
    a conduit coupling the tubular housing to the reservoir such that the spring volume is in fluid communication with the working volume; and
  a valve assembly, comprising:
    a housing including a spring port in fluid communication with the spring volume, an accumulator port in fluid communication with the control volume, and a third port, the housing defining a first flow path extending between the third port and the spring port and a second flow path extending between the third port and the accumulator port;
    a first check valve having a first crack pressure positioned within the housing along the first flow path; and
    a second check valve having a second crack pressure positioned within the housing along the second flow path,
    wherein the valve assembly provides an offset pressure between the spring volume and the control volume to maintain a response curve of the gas spring for different ride heights of the vehicle.

2. The suspension assembly of claim 1, wherein the first check valve and the second check valve open toward the third port to exhaust pressure from the spring volume and the control volume.

3. The suspension assembly of claim 2, further comprising a third check valve having a third crack pressure and positioned within the housing along the first flow path and a fourth check valve having a fourth crack pressure and positioned within the housing along the second flow path.

4. The suspension assembly of claim 3, wherein the third check valve and the fourth check valve open toward the spring port and the accumulator port to supply pressure from the third port.

5. The suspension assembly of claim 4, wherein the first crack pressure is equal to the fourth crack pressure and the second crack pressure is equal to the third crack pressure.

6. The suspension assembly of claim 5, wherein the second crack pressure is greater than the first crack pressure.

7. The suspension assembly of claim 6, wherein the first crack pressure is about two pounds per square inch and the second crack pressure is about fifty pounds per square inch.

8. The suspension assembly of claim 6, further comprising a check valve disposed between the spring volume and the spring port, the check valve configured to prevent short circuit fluid flow from the control volume to the spring volume across the valve assembly.

9. The suspension assembly of claim 3, wherein the housing defines a manifold that forms a portion of the first flow path and the second flow path.

10. The suspension assembly of claim 9, wherein the housing further defines:
  a spring manifold that couples the spring port to the first check valve and the third check valve; and
  an accumulator manifold that couples the accumulator port to the second check valve and the fourth check valve.

* * * * *